United States Patent Office.

JOHN S. LIGHTNER, OF WESTFORD, WISCONSIN.

Letters Patent No. 63,269, dated March 26, 1867.

IMPROVED LINIMENT.

*The Schedule referred to in these Letters Patent and making part of the same.*

TO ALL WHOM IT MAY CONCERN:

Be it known that I, JOHN S. LIGHTNER, in the county of Dodge, in the State of Wisconsin, have invented a new composition of matter, which compound I call Buttermilk Liniment; and I do hereby declare that the following is a full and exact description thereof.

To enable others skilled in the art to make and use my invention, I will proceed to describe its composition.

To one quart of vinegar I add one-half pint spirits turpentine, two and one-half ounces suger lead, one ounce salt, the white of three eggs, and one ounce of sulphuric acid, mixing thoroughly as each ingredient is added.

What I claim as my invention, and desire to secure by Letters Patent, is—

The liniment compounded as above set forth and described.

JOHN S. LIGHTNER.

Witnesses:
WILLIAM CUFF,
R. REDHEAD.